Sept. 4, 1951 G. LORD 2,566,344
SLIDING SPOOL FISHING REEL
Filed Aug. 25, 1948 2 Sheets-Sheet 2
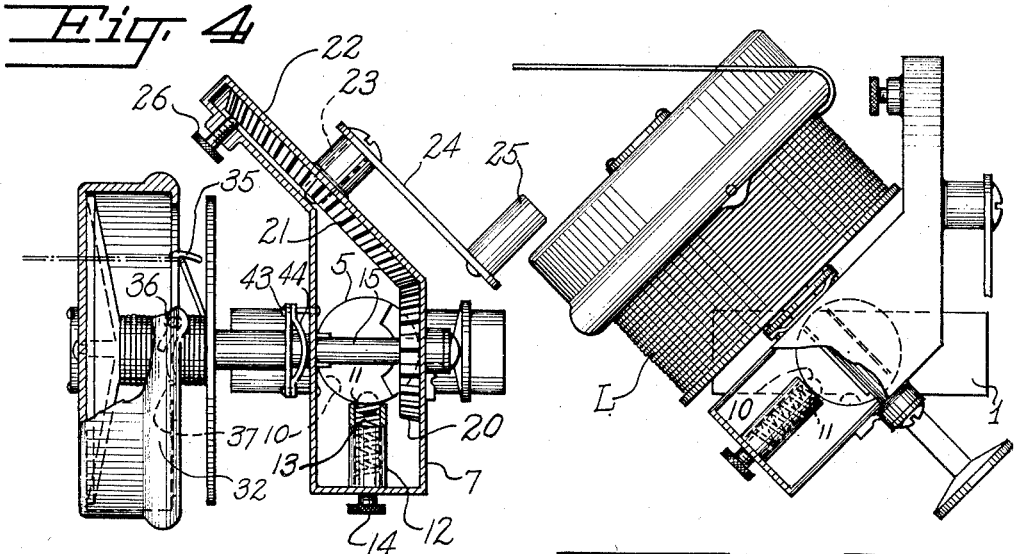
INVENTOR.
George Lord
BY *Victor J. Evans & Co.*
ATTORNEYS Patented Sept. 4, 1951

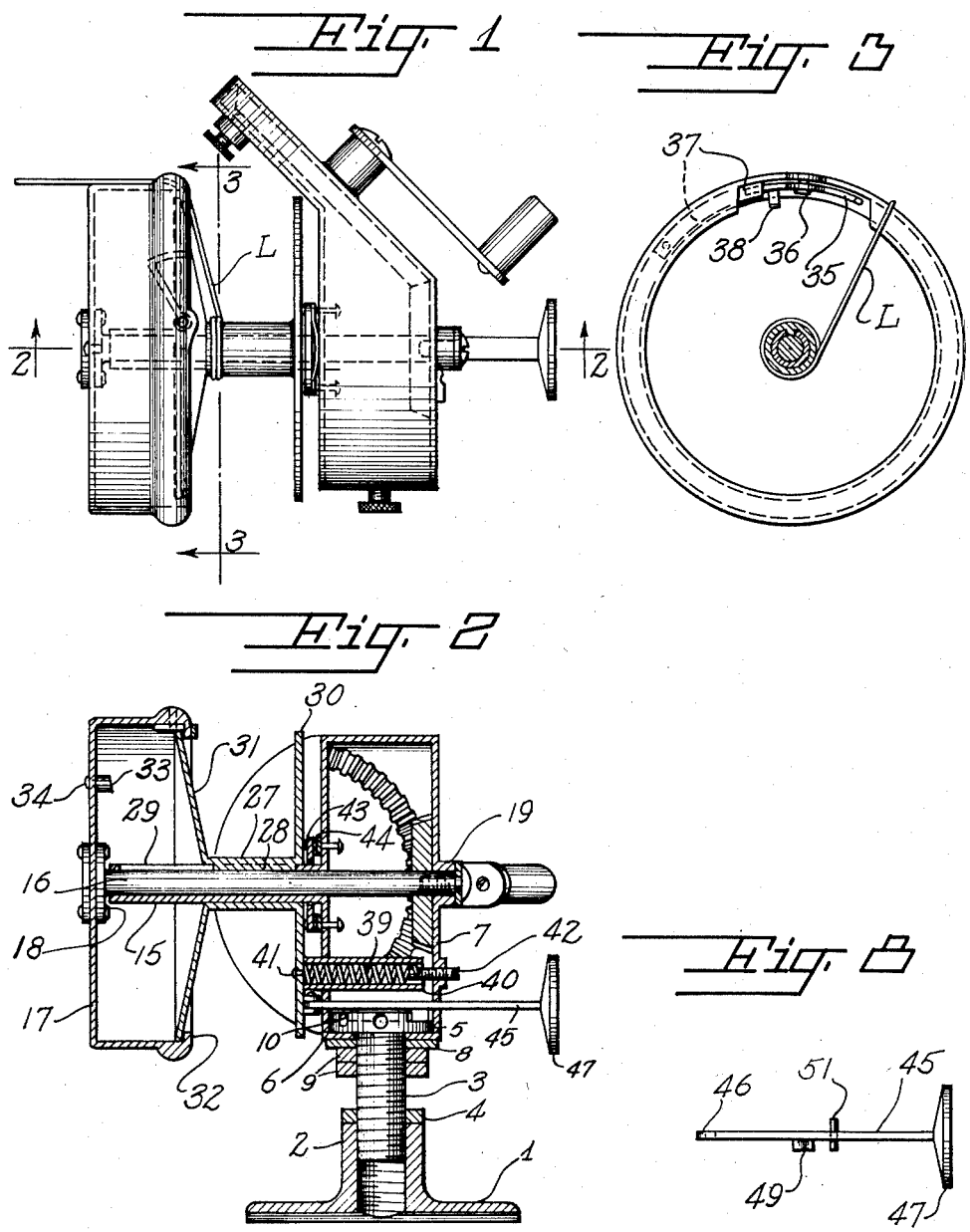

2,566,344

UNITED STATES PATENT OFFICE 2,566,344

SLIDING SPOOL FISHING REEL

George Lord, Stambaugh, Mich.

Application August 25, 1948, Serial No. 46,051

7 Claims. (Cl. 242—84.4)

My present invention relates to the general class of winding and reeling appliances, and more specifically to an improved sliding spool fishing reel of the type utilizing a non-rotary and laterally reciprocable spool to which the fishing line is attached and about which the line is wound or laid on by means of a rotary cage or manually operated carrier having a pick-up device for the line. Means are provided and manually operated for positive control of the line at all times to prevent twisting and eliminate the possibility of entanglement of the line, and to enhance the durability of the line by avoiding undue wear. The fishing reel, as a unit, includes a minimum number of component parts that may with facility be manufactured at low cost of production, and the parts may be assembled with convenience to provide a compactly arranged reeling device that is simple in construction and operation, durable, and easily handled.

The invention consists in certain novel features of construction and combinations and arrangements of parts as will hereinafter be described in detail, and more particularly set forth in the appended claims.

In the accompanying drawings I have illustrated a complete example of a physical embodiment of my invention wherein the parts are combined and arranged in accord with one mode I have devised for the practical application of the principles of my invention. It will, however, be understood that changes and alterations are contemplated, and may be made in these exemplifying drawings and mechanical structures, within the scope of my claims, without departing from the principles of the invention.

Figure 1 is a plan view of the reel with the sliding or traversing spool retracted; and Figure 2 is a vertical sectional view at line 2—2 of Fig. 1.

Figure 3 is a transverse sectional view at line 3—3 of Fig. 1. Figure 4 is a horizontal sectional view of the appliance with the line engaged by the hook or pick-up of the rotary carrier.

Figure 5 is a plan view showing the swivel arrangement of the reeling device.

Figure 6 is an end elevation of the reel attached to a fishing rod. Figure 7 is a detail sectional view at line 7—7 of Fig. 6; and Figure 8 is a detail view of the manually operated control lever or rod.

In the preferred form of the invention I employ a rod plate base, or concave attaching shell 1 that is adjustable and secured in usual or suitable manner on a standard type of fishing rod or pole R, and the base is provided with an integral upstanding bushing 2 that is internally threaded to receive a stud screw or swivel bolt 3 having a jamb nut 4 for engagement with the bushing in holding the parts in desired adjusted position.

The swivel bolt is fashioned with an enlarged head or circular and flat disk 5 seated within and projecting through an opening in the flat bottom wall 6 of a swiveled casing or housing 7, and an exterior washer 8, with lock nuts 9 coact with the head to permit adjustment and to take up wear, as well as to retain the swiveled housing in adjusted position.

For resiliently retaining the housing in different positions with relation to the swivel head, the latter is provided with spaced peripheral or edge sockets 10, and a pawl or detent ball 11 is mounted in the end of an interior horizontal and tubular spring housing 12 rigid with an end wall of the housing. The ball detent is arranged for engagement in the sockets for holding the housing 7 in desired position and a coiled spring 13 within the spring housing resiliently holds the ball in operative positions. The tension, and pressure of the spring on the ball may be adjusted by means of a set screw 14 threaded through the wall of the housing and bearing against the outer end of the spring.

As best seen in Fig. 2 the housing is equipped with an integral laterally projecting and exterior tubular extension or supporting sleeve 15 that forms a bearing for an operating shaft 16, and a circular drum, open-work cage, or winding carrier 17 for the line L is centrally attached, as at 18 on the outer free end of the shaft, while the other end of the rotary shaft is journaled and retained at 19 in an outer wall of the housing.

The shaft is rotated through its rigidly attached pinion 20 by means of a driving gear 21 journaled within an angular gear box 22 forming an extension of the main housing; and the stud shaft 23 rigid with the gear is provided with a crank arm 24 equipped with a knob or handle 24 for operating the shaft 15; and a usual clicker 26 is shown mounted on the gear box for engagement with the teeth of the driving gear wheel.

The line L at its inner end is attached to a non-rotatable slidable and spring-retracted spool, and the driven rotary drum, cage, or carrier rigid with the operating shaft is instrumental in winding or laying the line on the reel, and in guiding and unwinding the line from the reel, or spool. The non-rotatable traversing spool includes a cylindrical hub 27 slidably mounted upon the fixed sleeve 15, and for this purpose the hub 27 has a key or tongue 28 movable in the longitudinally extending slot or keyway 29 of the sleeve 15.

The reel is fashioned with a flat circular inner flange 30, and a spaced outer dished or flared head 31, the rim of which co-acts with an inner annular retaining flange or lip 32 of the drum or carrier to limit sliding movement of the spool.

For a dragging or braking action between the driving carrier or drum 17 and the reel head 31, a brake shoe 33 is attached on the inner face of the drum, as by screws 34, in position to be frictionally engaged by the dished inner face of the reel head 31 when the latter is moved to impinge against the shoe, as will be described.

For picking up and guiding the line L to and from the non-rotary spool, the rotary carrier is provided within its inner flanged rim 32 with a pivoted hook 35 located in a cut-out of the rim and pivoted at 36 on the carrier, and the hook, which is resiliently held by a leaf spring 37 attached to the carrier, is equipped with an inwardly projecting lug 38.

This line pick-up or guiding hook is resiliently projected and held outwardly from the open end carrier or drum by the spring for guiding the line, as in Fig. 4; and the hook or guide is retracted or withdrawn into dotted position of Fig. 1 by contact of the rim of the head 31 of the reel with lug 38, as the reel is retracted or shifted to the right as in Figs. 1 and 2.

The spool is resiliently held in open or retracted position of Figs. 1 and 2 by means of a coiled spring 39 parallel with and located below the operating shaft in the interior of the housing 7 and the spring is retained within an open-end housing 40 rigid with the inner face of the flange 30 of the spool. The spring housing 40 projects and is slidable through an opening in an inner wall of the housing 7, and one end of the spring is attached at 41 to the reel-flange 30 while the other end of the spring is anchored by adjusting screw 42 threaded in an outer wall of the housing 7.

When the reel is retracted by the spring it is held against a resilient or elastic washer 43 mounted on a second washer 44 rigid with the housing 7 and both washers surround the bearing sleeve 15 of the operating shaft.

For pushing the reel from position of Fig. 1 to position of Fig. 4, a push rod 45 is pivoted at 46 on the flange 30 of the reel, and slidably mounted in slots provided in the spaced side walls of the housing 7, a head or thumb knob 47 being rigidly mounted exterior of the housing on the free projecting end of the rod or bar.

The push rod or bar is located in position to extend across the swivel head 5, and the latter is provided with a guide groove or diametrical kerf 48 through which a guide lug 49 on the bar travels. To permit a swinging movement of the housing 7 on its swivel mount, the swivel head 5 is fashioned with an arcuate groove 50 to accommodate the lug 49, and a cross pin 51 secured to the bar and alined with the lug 49, is adapted to frictionally engage with a cam 52 on the exterior face of the outer wall of the housing to latch the bar or rod and the reel in open position.

With the line wound on the spool and the reel housing in normal position of Figs. 1 and 2, by placing the thumb on the head 47 of the push rod or bar 45, the bar as it is pushed to the left swings the housing on its swivel to the right to position shown in Fig. 5. During this movement the spring ball detent is shifted from one socket to the other socket and then the housing is resiliently held in position of Fig. 5 where the line is held against unwinding or slithering off the spool. In the hands of the operator, the pole P is now flexed backward and snapped forward and the force of the resulting pull on the line immediately pulls the housing and spool back to normal position so that the line may be paid out, slithering over the rounded and flanged rim 32 of the cage or drum 17.

For braking or dragging the line, by thumb pressure on the push bar or rod the dished head of the spool is pressed against the stationary shoe 33 and into frictional contact therewith; and if and when the operator desires to stop the baited line at a certain point, pressure is applied to the pushing knob, the housing is given its swivel movement, and the spool is turned to position of Fig. 5 to stop the line.

For winding the line in normal position, the push rod 45 is first pulled slightly to the right in Fig. 7 to release catch pin 51 from its cam seat or keeper 52, and then, with the thumb on control head 47 the rod is pushed inwardly carrying pin 51 with it through the slot of the housing. Lug 49 and the pin 51 are slid into the kerf or slot 48, and the housing is thereby held against swiveling movement. The rim of the dished spool-head 31 releases the lug 38 of the link pick-up hook, and the spring 37 projects the pick-up hook for engagement with the line L as the winding in of the line is started by manually turning the crank handle 24—25. In this winding movement of the spool, the control rod is reciprocated to work the spool back and forth for evenly distributing the coils of the wound line on the spool.

When a fish is hooked, the push rod or control rod is reciprocated to alternately apply and release the spool head from the brake shoe as the fisherman plays the fish. When the bait is wound to the end of the rod, thumb pressure on head 47 is released and the retracting spring 39 restores the spool to normal position bearing against the spring washers 43—44. In this retracting movement the control rod with its catch pin 51 moves through and from the housing, whereupon the control rod is laterally pushed slightly to engage the catch pin with its cam seat 52 and the resilient washers 43—44 hold the catch pin in its seat.

Having thus fully described my invention, what I claim as new and desire to secure by Letters Patent is:

1. In a fishing reel of the sliding non-rotatable spool type, the combination with a housing, a base and a bolt threaded therein, a swivel head on the bolt within the housing, and resilient means co-acting with the head and housing for retaining the latter in adjusted position, of a spool slidably supported on and exterior of the housing, a control rod pivoted to the spool and extended through the housing, and co-acting means on the rod and head for guiding the rod.

2. In a fishing reel of the sliding non-rotatable spool type, the combination with a housing, a base and a bolt threaded therein, a swivel head on the bolt within the housing, a kerf in the swivel head, and a spring-pressed detent on the housing co-acting with the head to retain the housing in swiveled position, of a spool slidably supported on and exterior of the housing and a retracting spring connecting the spool with the housing, a control rod connected to the spool and extended through the housing, and a guide lug on the rod for co-action with the kerf in the swivel head.

3. In a fishing reel of the slidable non-rotatable spool type, the combination with a supporting base and a housing swiveled thereon, and resilient means for retaining the housing in swiveled adjusted position, of a spring-retracted spool slidably supported on and exterior of the housing, a control rod pivoted to the spool and extended through the housing, and means for detachably fastening the control rod to the housing.

4. In a sliding spool fishing reel, the combination with a housing having a lateral tubular extension, an operating shaft journaled in the housing and extension and means for operating the shaft, and a winding drum mounted over the free end of the shaft, of a non-rotatable spool slidable on the extension and resilient means for retracting the spool to the housing, a retractable line pick-up carried by the winding drum, and a reciprocable control rod mounted in the housing for shifting the spool.

5. In a fishing reel, the combination with a supporting base and a housing swiveled thereon and a slidable non-rotatable spool supported by the housing, and means for retracting the spool, of an axially arranged operating shaft journaled in the housing and means for rotating the shaft, a winding drum mounted on the end of the shaft and a retractible line-hook carried by the drum, a reciprocable rod mounted in the housing for controlling the spool, a bolt having a swivel head thereon connecting said base to said housing and coacting means on the rod and head for detachably fastening the rod to the housing.

6. In a fishing reel, the combination with a housing and a slidable, spring retracted, non-rotatable spool supported by the housing, of an axially arranged operating shaft journaled in the housing and manual means for rotating the shaft, of a resilient friction device between the spool and the housing, a winding drum rigid with the free end of the shaft and a retractible line pick-up carried by the drum, a push rod mounted in the housing for controlling the spool, and co-acting means on the push rod and housing for retaining the rod in retracted position.

7. In a fishing reel, the combination with a housing having a lateral tubular extension, a non-rotatable spool slidable on the extension and resilient means for retracting the spool, and a resilient friction device between the spool and the housing, of an operating shaft journaled in the housing and its extension and manual means for turning the shaft, a winding drum rigid with the shaft and a line pick-up device carried thereby, means on the spool for releasing the pick-up device, a push rod mounted in the housing for controlling the spool, and co-acting means on the rod and housing for retaining the rod in retracted position.

GEORGE LORD.

REFERENCES CITED

The following references are of record in the file of this patent:

UNITED STATES PATENTS

| Number | Name | Date |
| --- | --- | --- |
| 2,314,616 | Garie | Mar. 23, 1943 |